(12) United States Patent
Bolik

(10) Patent No.: US 10,065,234 B2
(45) Date of Patent: Sep. 4, 2018

(54) FORMING MACHINE AND METHOD FOR CONTROL OF A FORMING MACHINE

(71) Applicant: SMS group GmbH, Duesseldorf (DE)

(72) Inventor: Ralf Bolik, Moenchengladbach (DE)

(73) Assignee: SMS group GmbH, Duesseldorf (DE)

( * ) Notice: Subject to any disclaimer, the term of this patent is extended or adjusted under 35 U.S.C. 154(b) by 261 days.

(21) Appl. No.: 14/683,226

(22) Filed: Apr. 10, 2015

(65) Prior Publication Data
US 2015/0290700 A1 Oct. 15, 2015

(30) Foreign Application Priority Data
Apr. 11, 2014 (DE) .................. 10 2014 005 333

(51) Int. Cl.
| | |
|---|---|
| B21H 1/06 | (2006.01) |
| B21C 51/00 | (2006.01) |
| B21J 9/20 | (2006.01) |
| G01B 11/25 | (2006.01) |
| B21D 5/00 | (2006.01) |
| B21D 22/00 | (2006.01) |
| B21B 5/00 | (2006.01) |

(52) U.S. Cl.
CPC ............. *B21H 1/06* (2013.01); *B21C 51/00* (2013.01); *B21J 9/20* (2013.01); *G01B 11/25* (2013.01); *B21B 5/00* (2013.01); *B21D 5/00* (2013.01); *B21D 22/00* (2013.01)

(58) Field of Classification Search
CPC ............. B21H 1/06; B21J 9/20; B21C 51/00
See application file for complete search history.

(56) References Cited

U.S. PATENT DOCUMENTS

| | | | |
|---|---|---|---|
| 3,186,202 | A | 6/1965 | Ulrych |
| 3,698,218 | A | 10/1972 | Wieting |
| 3,839,887 | A | 10/1974 | Vieregge |
| 7,679,757 | B1 | 3/2010 | Harris et al. |
| 9,127,936 | B2 | 9/2015 | Freitag et al. |
| 2013/0067898 | A1 | 3/2013 | Onishi et al. |
| 2014/0029018 | A1 | 1/2014 | Freitag et al. |
| 2015/0056315 | A1 | 2/2015 | Pannewtiz et al. |

FOREIGN PATENT DOCUMENTS

| | | |
|---|---|---|
| CN | 101934291 A | 1/2011 |
| CN | 103328923 A | 9/2013 |
| DE | 25 04 969 A1 | 8/1976 |
| DE | 38 24 856 A1 | 1/1990 |
| DE | 39 21 094 A1 | 1/1991 |

(Continued)

OTHER PUBLICATIONS

Machine translation of DE3923275, Noll et al., pp. 1-9, translated on Mar. 27, 2017.*

(Continued)

*Primary Examiner* — Teresa M Ekiert
(74) *Attorney, Agent, or Firm* — Collard & Roe, P.C.

(57) ABSTRACT

A forming machine, particularly a ring-rolling machine, which includes a light section sensor, which is directed at a workpiece disposed in a work region of the forming machine, can work precisely while having a simple mechanical-engineering structure. The light section sensor may be directed at a forming region in which the working tool acts in forming manner.

20 Claims, 1 Drawing Sheet

(56) References Cited

FOREIGN PATENT DOCUMENTS

| | | |
|---|---|---|
| DE | 39 23 275 C2 | 5/1992 |
| DE | 43 12 565 A1 | 10/1994 |
| DE | 102 31 430 A1 | 2/2004 |
| DE | 10 2006 057040 B3 | 5/2008 |
| DE | 10 2010 046 737 A1 | 3/2012 |
| DE | 10 2011 000 304 A1 | 7/2012 |
| EP | 1 245 302 A1 | 10/2002 |
| EP | 1 679 137 A1 | 7/2006 |
| EP | 2 444 176 B1 | 10/2012 |
| GB | 2 454 281 A | 5/2009 |
| JP | S62-010919 U | 1/1987 |
| JP | S62-101333 A | 5/1987 |
| JP | H02-133131 U | 11/1990 |
| JP | H04-182005 A | 6/1992 |
| JP | H04-210836 A | 7/1992 |
| JP | H06-153200 A | 5/1994 |
| JP | H07-083635 A | 3/1995 |
| JP | H11-156412 A | 6/1999 |
| JP | H11-285703 A | 10/1999 |
| JP | 2000-288616 A | 10/2000 |
| JP | 2002-210503 A | 7/2002 |
| JP | 2008203091 A | 9/2008 |
| JP | 2008-246496 A | 10/2008 |
| JP | 2011-038558 A | 2/2011 |
| JP | 2015-179021 A | 10/2015 |
| SU | 668142 A1 | 6/1985 |
| WO | 2012/101166 A1 | 8/2012 |
| WO | 2013/041083 A2 | 3/2013 |

OTHER PUBLICATIONS

Siegfried Helduser, "Electrohydraulic System Technology: Key aspects in the development of stationary hydraulics" ("Elektrisch-hydraulische Systemtechnik"), O+P. Oelhydraulik und Pneumatik, Jan. 2006, vol. 50, No. 1, p. 16-23 (with English translation).

European Search Report dated Sep. 25, 2015 in European Application No. 15 162 656.1 with English translation of the relevant parts.

"TBK Measuring Equipment—Contactless measurements for optimal production processes," TBK automatization and mess technique, Mar. 2014 (Mar. 2014), SMS group, Found in internet: URL:http://meer.sms-group.com/fileadmin/user_upload/pdf/publicationgroup/langprodukte/profil/TBK_DE_03-14.pdf, [found on Sep. 11, 2015], total of 20 pages.

German Examination Report dated Nov. 11, 2014 in in German Application No. 10 2014 005 333.4 with English translation of the relevant parts.

German Examination Report dated Jan. 8, 2015 in German Application No. 10 2014 005 332.6 with English translation of the relevant parts.

Relevant Portion of Notification of Provisional Rejection dated May 11, 2016 for Korean Patent Application No. 10-2015-0051007.

Japanese Office Action dated May 10, 2016 in Japanese Application No. 2015-081223.

Siegfried Helduser, "Elektrisch-hydraulische Systemtechnik", O+P. Oelhydraulik und Pneumatik, Jan. 2006, vol. 50, No. 1, p. 16-23.

European Examination Report in 15162853.4-1702, dated Sep. 28, 2015, with English translation of relevant parts.

Wikipedia entry for "Light section", downloaded on May 16, 2017 from https://en.wikipedia.org/wiki/Light_section.

Relevant parts of Korean Office Action in KR 10-2015-0051007, dated Apr. 17, 2017.

Japanese Office Action in JP 2015-081224, dated May 10, 2016.

Relevant parts of Korean Office Action in KR 10-2015-0050585, dated Apr. 20, 2016.

English Translation (from German translation) of Chinese Office Action in CN 201510173351.7, dated Jul. 21, 2016.

Relevant parts of Korean Office Action in KR 10-2017-0018540, dated Apr. 17, 2017.

* cited by examiner

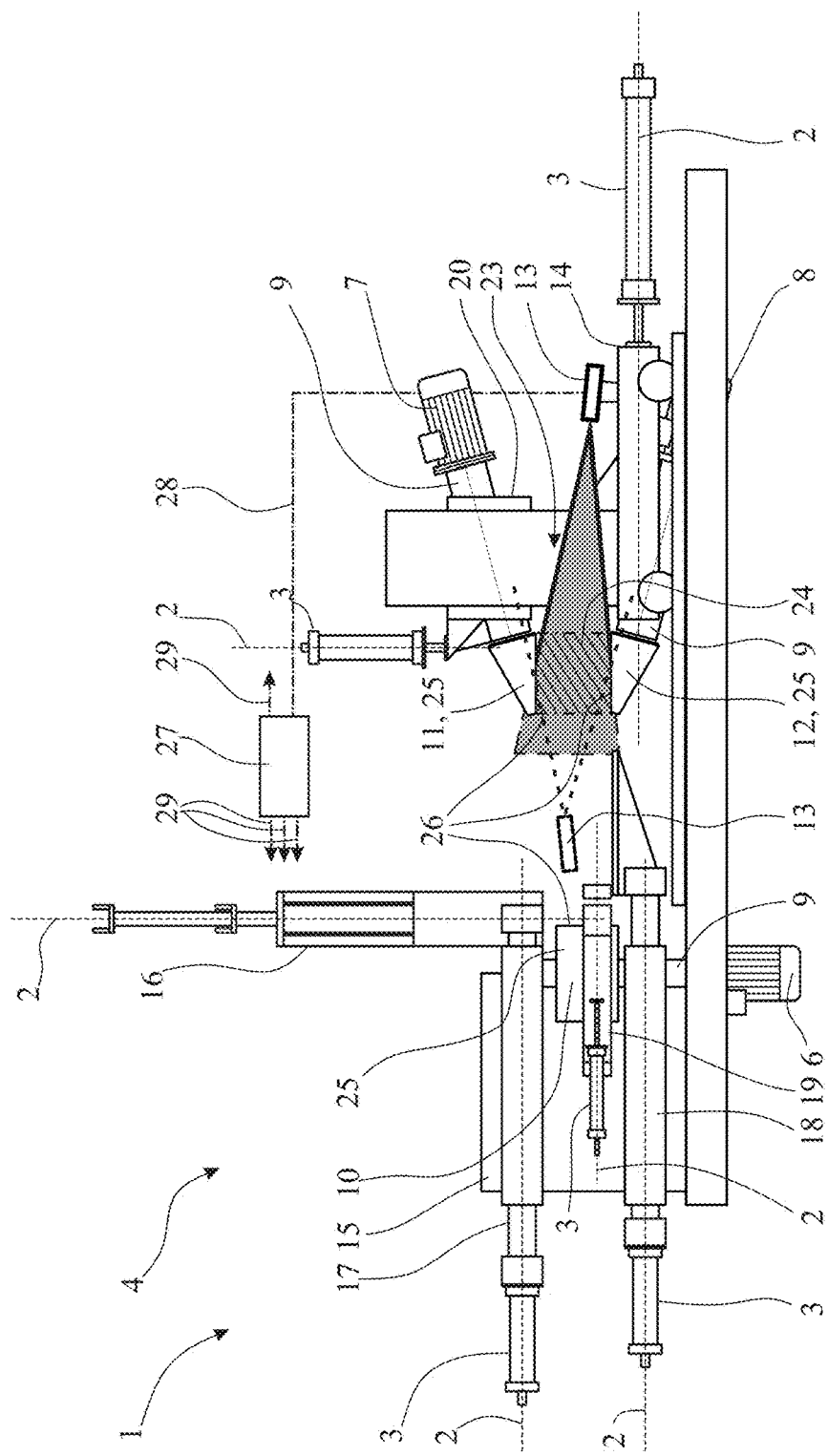

FORMING MACHINE AND METHOD FOR CONTROL OF A FORMING MACHINE

CROSS REFERENCE TO RELATED APPLICATIONS

Applicant claims priority under 35 U.S.C. § 119 of German Application No. 10 2014 005 333.4 filed Apr. 11, 2014, the disclosure of which is incorporated by reference.

BACKGROUND OF THE INVENTION

1. Field of the Invention

The invention relates to a forming machine and to a method for control of a forming machine. In particular, the invention relates to a ring-rolling machine and to a method for control of a ring-rolling machine.

2. Description of the Related Art

Corresponding forming machines are sufficiently known from the state of the art in many respects, for example as forges, rolling machines, ring-rolling machines, extruders. Generally, precursor materials, such as, for example, cast precursor materials, in particular, are formed to produce semi-finished materials, or semi-finished materials are formed to produce workpieces, wherein the forces and pressures required for this purpose are applied, by way of corresponding forming tools, to the formed workpieces, in each instance, whether these materials are cast precursor materials or whether these materials are semi-finished products or other workpieces.

In particular, ring-rolling machines and control methods for such machines are sufficiently known from the state of the art, for example from DE 25 04 969 A1 or also from DE 39 23 275 C2. In this connection, the ring-rolling machines regularly comprise a radial drive, which is connected to interact with a roll shaft of a radial roll that acts in the radial direction, and at least one axial drive, which is connected to interact with a roll shaft of an axial roll that acts in the axial direction. In this connection, as shown in DE 25 04 969 A1, for example, the axial rollers generally serve to axially form a workpiece to be rolled, in other words in a direction parallel to the axis of rotation or axis of symmetry of the ring-shaped workpiece, while at the same time or one after the other, the ring is formed radially relative to the axis of rotation or axis of symmetry of the workpiece or relative to its vertical axis, by way of the radial roll. Frequently, a roll mandrel also interacts with the radial roll.

In this connection, it is understood that the rolls with their related roll shafts are generally put into motion or controlled rotationally, by way of corresponding radial drives or axial drives. Furthermore, such forming machines also comprise linear axles that are generally regulated hydraulically and serve for setting these rollers relative to one another, for example. Likewise, other modules, such as, for example, an intake guide, the roll mandrel or others can be controlled in corresponding hydraulically regulated manner, by way of corresponding linear axles.

Thus it is known, for example, in the case of ring-rolling machines, to monitor the progress of forming by means of mechanical sensing rollers or laser triangulation using a laser dot, and, if necessary, to also intervene in the rolling process in controlling or regulating manner. In the case of very tall rings or sleeves, sometimes up to three laser dots are used for triangulation measurements. In accordance with DE 39 23 275 C2, the forming step can also be monitored by way of shadow formation by means of a schlieren diaphragm, but doing so is also very complicated in terms of design.

SUMMARY OF THE INVENTION

It is an object of the present invention to make available a forming machine and a method for control of a forming machine, which work precisely while having a simple mechanical-engineering structure.

These and other objects are accomplished by a forming machine and a method for control of a ring-rolling machine, having the characteristics according to the invention. Further embodiments, which can also be advantageous independent of these characteristics, are found below.

In this connection, the invention proceeds from the fundamental recognition that by means of the constant laser line, which utilizes a light section sensor for its measurements, a profile can be pursued during forming—specifically as long as the workpiece is situated in the work region of the forming machine—in so precise a manner that the effect of the forming forces applied to the workpiece can be subjected to monitoring, in detail.

Depending on the specific embodiment, the constant laser line of a light section sensor having a corresponding camera allows simultaneous measurement and evaluation of more than 500 or more than 1000 or even more than 3000 measurement points.

In this connection, an imaging system similar to laser triangulation with dot lasers is generally present in the case of such light section sensors, which might also be called light section profile sensors or light section triangulation sensors, but with line-generating optics and an area sensor, wherein the laser light is formed into a line by means of line-generating optics, for example a cylinder lens, and projected onto the measurement object, and the remitted light is imaged on the area sensor by way of imaging optics, and subsequently, the imaged laser image is also geometrically distorted and evaluated. In this way, arching or other distortions, in particular, which can occur while rolling rings, can be precisely recognized.

Likewise, it is understood that in the case of other forming processes, local profile changes or profile changes that occur for only a short period of time can be precisely determined and monitored. Likewise, the great number of registered image points allows error analysis of the respective measured values and measurement results.

It is true that the use of light section sensors is already fundamentally known from DE 10 2010 046 737 A1 or also from DE 10 2011 000 304 A1. Here, however, the measurements take place either before or after forming, so that targeted interventions during forming, which particularly take into consideration the reaction of the individual workpiece to the respective forming process, cannot take place.

For example, in the case of a simple mechanical-engineering structure, a forming machine that comprises at least one forming tool that acts on a workpiece disposed in a work region of the forming machine, so as to form it, can nevertheless work precisely if the forming machine comprises a light section sensor that is directed at the workpiece disposed in the work region of the forming machine and represents an input variable for a forming control device, which sets the at least one forming tool with reference to the workpiece during the forming process.

Likewise, precise work can be guaranteed to control a forming machine, with a simple mechanical-engineering structure, if the profile of a workpiece formed in the forming machine is monitored by means of a light section sensor.

It is understood that the advantages of a constant laser line, which is made available by a light section sensor, can be correspondingly advantageous also when using multiple light section sensors, particularly if these sensors are disposed to intersect or are oriented in some other linearly independent manner. Likewise, it is conceivable to use a corresponding fanned-out laser beam that covers a laser field, in place of a continuous laser line.

Corresponding monitoring of the profile can then be utilized to control the forming machine or the ring-rolling machine, whereby this control allows outstandingly precise work of the corresponding ring-rolling machine, with simple mechanical-engineering effort—even independent of the other characteristics of the present invention.

In the present connection, the term "work region" describes the region that a workpiece takes up while it is being formed in the forming machine. In rolling processes, this region is the spatial volume within which the workpiece passes by the rolls, as long as it is in contact with at least one of the rolls. Particularly in the case of multi-stand rolling machines for rolling elongated workpieces, the workpiece leads to relatively long work regions, because ultimately, the work region even for the regions of the workpiece that have not yet reached the first roll stand is already reached upon engagement with the first rolls of the first roll stand.

Likewise, regions of the workpiece are still situated in the work region of the respective forming machine, according to the definition, if an end of the workpiece is still in contact with the rolls of the last roll stand.

In every case, the work region comprises the regions of a workpiece subject to forming, through which the forming forces and tensions pass that are present in or have been introduced into the workpiece itself, because of the forming forces.

For example, the region that has just left a pressing die of an extruder, or the region of a workpiece that has just left the roll pass is generally still put under tension by the rolling forces, until it has reached a sufficient distance from the respective forming tool. Such regions must be considered part of the work regions, in any case.

In this regard, such a light section sensor may be disposed directly between different roll stands of a rolling mill or also directly at the exit of an extruder, in order to thereby obtain data about the corresponding profile in real time and to actually act on the forming process of the workpiece that has just been formed.

Preferably, the light section sensor is directed at a forming region in which the forming tool acts in forming manner. As has already been explained above, a forming tool does not necessarily press on a workpiece only in the region with which it is in contact. Instead, the tensions in the workpiece applied by means of the forming forces reach deep into the workpiece and frequently also far into regions in which the workpiece is not in contact with the forming tool. In the present connection, the entire forming region in which a forming tool is still active in the workpiece is referred to as the forming region. If the light section sensor is now directed onto this forming region or onto surfaces of the workpiece that are situated in a forming region, then it is possible to obtain very direct insight into the tensions and forces that occur during forming and into the profile changes that occur there. This insight makes it possible to be able to act on the forming process in very targeted and direct manner.

Thus it is possible, for example, to align the light section sensor directly with regions behind or ahead of any rolls or extruder dies. In particular, the light section sensor can also be directed at a workpiece region between different consecutive roll stands and thereby detect profile changes of the respective workpiece individually between the roll stands. If a roll pass between rolls is not completely closed, measurements between these rolls, in particular, are also possible.

By means of its linear monitoring possibility, the light section sensor can monitor the surface of the workpiece not only in the radial direction, but also in the axial direction, if applicable, particularly all the way to the upper and lower edges of the workpiece, in other words in the axial direction. In this regard, axial profiles can also be measured and monitored accordingly during forming, if applicable. It is understood that if necessary, further light section sensors can also be provided accordingly, in order to make the monitoring more precise. Likewise, it is conceivable to provide a light section sensor at a different location, as well, and to utilize it for monitoring accordingly.

If the forming machine comprises at least two forming tools that act on the workpiece simultaneously, in opposite directions, such as, for example, rolls, forging dies or bending dies, it is advantageous if the light section sensor is directed at a region of the workpiece that lies between these two forming tools. This arrangement generally results in a very precise image of the tensions and forces or profile changes that occur during forming.

Alternatively or cumulatively, the light section sensor can be directed at at least one forming surfaces of one of the two forming tools directed at the workpiece. This arrangement makes it possible to pursue the relative movement of the forming tool with reference to the workpiece during the forming process, in that both the forming surface and the surface of the workpiece in the vicinity of the forming surface can be registered, if applicable, in order to be able to optimize the forming procedure in this manner. When rolling conical rings, for example, the speed of rotation of the upper and lower axial rolls can be adapted to the main roll in terms of their circumferential speed. Poor adaptation in this regard leads to rolled rings that contain tensions and have a poorer quality, because of the differences in contact speed.

It is understood that the aforementioned embodiment is particularly advantageously suited for a precise method of work if the light section sensor is directed at at least one forming surface of both forming tools directed at the workpiece. Likewise, it is understood if not only the forming surfaces but also the regions of the workpiece in the vicinity of the forming surfaces and preferably also the entire region of the workpiece between these two forming tools are monitored accordingly by the light section sensor. In this connection, it should be explained that—depending on the specific embodiment of the present invention—multiple light section sensors could also be used, supplementing one another; the latter arrangement, however, disadvantageously requires significant additional effort and expenditure, particularly because the previously known measurement setup with laser dot and triangulation measurement is subject to simplification by means of the light section sensors, which simplification no longer exists to the same degree when using multiple light section sensors; because of the accuracy of the measurement results, this consideration must surely be weighed.

In this regard, it is understood that multiple light section sensors can also be used, if this arrangement appears practically on the basis of the measurement accuracy that appears practical or on the basis of the expanded measurement and monitoring possibilities. Accordingly, the forming machine can comprise at least two light section sensors, which are directed at the workpiece disposed in the work region of the forming machine, or the profile of the workpiece formed in the forming machine can be monitored by at least two light section sensors.

In particular, the two light section sensors can be oriented to intersect or in some other linearly independent manner, so that different regions of the workpiece can be registered accordingly and then also monitored. Thus, it is possible, for example, to monitor different regions, such as, for example, axial profiles and radial profiles, at the same time, which can be implemented, for example, in that the two light section sensors are directed both radially and axially at the workpiece. Also, different issues in a single region of the workpiece may be monitored by two light section sensors oriented to intersect or otherwise in linearly independent manner. For example, a surface shaping between two axial rolls and the forming region that lies in between may be monitored with a first light section sensor, oriented parallel to a rolled ring, and the curvature of the ring in this region may be monitored by a light section sensor directed at the ring perpendicular to the first.

Alternatively or cumulatively, the two light section sensors can be oriented in collinear manner. This arrangement also leads to a corresponding expansion of the measurement and monitoring possibilities. Preferably, the orientation is in such a manner that the corresponding laser lines are oriented in collinear manner without any distance and with only a slight overlap, so that in this way, at first a correspondingly increased accuracy or a correspondingly expanded measurement field is brought about. It is understood that the overlap as such expands the measurement field, wherein expanded error-checking possibilities can also lie in the overlap, if applicable, which can justify selecting the overlap to be somewhat greater, if applicable.

Preferably, the profile is measured during forming, so that then precise statements concerning the forming procedure can be made when a comparison with a reference profile is made. In particular, if the comparison is also carried out during forming, direct interventions or even regulation procedures for regulating the forming machine can be based on these measurements or these comparisons. Accordingly, it is possible to generate controlling interventions into the forming procedure of the forming machine from the comparison results and thereby to control the rolling procedure so that it is adapted to the comparison results. In particular, it is possible to generate regulating interventions and to configure and utilize a regulation circuit for controlling the forming machine, utilizing these comparison results.

In the present connection, it is understood that the corresponding advantages of a light section sensor can advantageously be used in all forming machines having a forming tool that acts on a workpiece disposed in a work region of the forming machine, so as to form it. In particular, forges, propelling machines, press-in machines, rolling machines, extruders, folding machines, deep-drawing machines, corrugating machines, crimping machines, straightening machines, bending machines, stretching machines, and compression machines can be provided with correspondingly oriented light section sensors, to corresponding advantage. Rolling machines or presses can be oriented accordingly, in particularly advantageous manner. This capability particularly holds true for ring-rolling machines, to particular advantage.

The ring-rolling machine can have at least a pair of axial rolls as forming tools, wherein then, the light section sensor measures from a first roll of a roll pair to a second roll of the roll pair. This arrangement directly leads to a measurement of a first forming tool all the way to a second forming tool, wherein corresponding measurements can be advantageous both in the case of the radial rolls but also in the case of the axial rolls. In this manner, a measurement takes place directly in the forming region, in each instance, so that the profile, in particular, can be monitored during forming.

It is understood that—if applicable—corresponding light section sensors can be provided cumulatively or alternatively to this arrangement, at a different location. For example, corresponding light section sensors can also be directed at the workpiece in unstressed regions of the ring, in other words, for example, between the radial rolls and the axial rolls, in regions offset by 90°, for example, with regard to the radial rolls or the axial rolls, with reference to the ring. This arrangement would then be useful for profile monitoring in the work region outside of the forming region, because possible rolling forces applied by the rolls there no longer act on the structure of the rolled material.

Specifically the measurement from one roll all the way to another roll, which act on the workpiece opposite one another, allows monitoring the rolls in the case of conical rings, so that the contact speeds can be optimized, in order to counteract tensions or a qualitatively poorer rolling result in this manner. Likewise, the possibility exists of representing the current degree of profile filling and to evaluate it or to compare it with a reference profile. Then, a machine controller could actually undertake a qualitative evaluation of the profile rolling process, within a tolerance band, if applicable.

In an evaluation, it is theoretically also possible to line up all the measured light sections of a rolling procedure, one after the other, and to thereby represent a representation, particularly a three-dimensional representation, of the total forming process as a developed view over time. This arrangement also allows optimization of the entire rolling process. For precise measurements, and, in particular, also for regulation of the forming machine, it is advantageous that a corresponding measurement takes place in real time and/or in equidistant manner, for example every ten milliseconds; then, a precise image, which can also be used for regulation processes, if necessary, can be obtained.

Preferably, the light section sensor is disposed on an axial roll stand or at a location facing away from a radial roll stand, and directed at the workpiece. In this way, it can be guaranteed that the light section sensor registers the workpiece in precise and simple manner, particularly on its radial side, in order to fulfill its monitoring function.

In particular, the light section sensor can be disposed on an axial stand, for example, and thereby can be radially displaced with this stand, if necessary, so that it is directed precisely with reference to the workpiece even during the ring-rolling process.

The mechanical-engineering structure of a ring-rolling machine can be further simplified by means of a freely selectable diameter coordinate in the vertical Z axis. This simplification allows elimination of a mechanical height adjustment of one or more triangulation lasers, because the light section sensor can be used in very flexible manner in this regard.

The embodiments explained above are particularly advantageous for small and medium-size ring-rolling mills up to a rolling force of 2,000 kN. These embodiments, however, may also be advantageous for large ring-rolling mills up to a rolling force of 45,000 kN.

Corresponding use of the light section sensors is particularly advantageous in forming machines that act in forming manner at temperatures above 800° C., preferably at temperatures above 850° C., or in corresponding forming procedures, because it is possible to conduct the measurements in contact-free and relatively direct manner. In this way, measurements can take place during forming, in particular, and also can be evaluated accordingly, if applicable. The same also holds true for the use of the light section sensors in hot-forming forming machines and in hot forming.

It is understood that the above explanation with regard to the advantages in the case of ring-rolling mills, to the extent that they relate to the placement of the light section sensor or the configuration of the measurement line between the radial rolls and/or axial rolls, are accordingly advantageous also in the case of other forming machines having two forming tools, if the related light section sensor(s) is/are directed accordingly with reference to the workpieces and the correspondingly acting forming tools.

It is understood that the characteristics of the solutions described above and in the claims can also be combined, if applicable, in order to be able to implement the advantages cumulatively, accordingly.

BRIEF DESCRIPTION OF THE DRAWINGS

Further advantages, goals, and properties of the present invention will be explained using the following description of an exemplary embodiment, which is particularly also shown in the attached drawing. In the drawing, the single FIGURE shows a schematic side view of a ring-rolling machine.

DETAILED DESCRIPTION OF PREFERRED EMBODIMENTS

The ring-rolling machine 4 shown in the FIGURE, structured as a forming machine 1, comprises multiple hydraulically regulated linear axles 2, which are controlled, in each instance, by way of linear drives 3, such as hydraulic cylinders, for example, as well as a radial drive 6 and axial drives 7, 8, which drive corresponding radial rolls 10 and axial rolls 11, 12 by way of their roll shafts 9, in each instance, as forming tools 25.

In known manner, the ring-rolling machine 4 comprises a radial roll stand 15, on which a mandrel lifting apparatus 16 is radially displaceable by way of an upper drawing frame 17, wherein the mandrel lifting apparatus 16 in turn can axially displace the mandrel, which is not shown, and ultimately acts radially as a forming tool 25, in interplay with the radial roll 10. Likewise, a lower drawing frame 18 is provided for further modules. For example, the ring-rolling machine 4 shown in the FIGURE also has an intake-side centering unit 19 as well as a radially displaceable axial roll stand 14, which carries the two axial rolls 11 and 12, and an axially displaceable pusher 20, by means of which the upper axial roll 11 of the two axial rolls 11, 12 can be axially set. All of these movement possibilities are controlled by way of hydraulically regulated linear axles 2, by means of linear drives 3, in this exemplary embodiment.

The roll shaft 9 of the radial drive 6, which shaft is connected with the radial roll 10, is configured in one piece in this embodiment, wherein in an alternative embodiment, it can also be configured in multiple pieces but disposed coaxially.

A light section sensor 13 is disposed on the axial roll stand 14, which sensor is directed at a workpiece to be rolled or at a work region 23 in which the workpiece can be disposed and rotates during rolling. In this specific exemplary embodiment, the light section sensor 13 is directed at a forming region 24 between the two axial rolls 11, 12, in which region these axial rolls 11, 12 act on the workpiece or on the ring to be rolled, with their forming surfaces 26, so as to form it. An additional light section sensor 13 is part of the forming machine and is directed at the work region 23 or at the workpiece in the work region 23.

It can be guaranteed by means of the placement of the light section sensor 13 on the axial roll stand 14 that the light section sensor 13 always remains at essentially a constant distance with reference to the workpiece and the axial rolls 11, 12. This arrangement allows particularly simple regulation with regard to the positioning of the axial roll stand.

The forming machine 1 or ring-rolling machine 4 shown in the drawing makes it possible to project a constant laser line on the mantle surface of a hot ring as a workpiece, which generally has temperatures between 900° C. and 1200° C., on the basis of the light section laser or on the basis of the light section sensor 13, and to simultaneously measure it during rolling. In this manner, different profile shapes during rolling can be registered in detail, which is not possible by way of mechanical sensing rollers or by means of triangulation lasers, even if up to three triangulation lasers are possibly used here, not even in rudimentary form.

In particular, it is also possible to compare a reference profile with a current actual profile, which can be done on a monitor, for example, on the one hand, so that a user would have the possibility of seeing and evaluating the current degree of profile filling. The machine controller could also undertake a qualitative evaluation of the profile rolling by means of a tolerance band. Likewise, the rolling process as such may be influenced on the basis of this evaluation, in other words to control or regulate the forming machine 1 or ring-rolling machine 4.

Preferably, the light section sensor 13 or—depending on the specific requirements—only the display or the registered camera window of the light section sensor 13 is adjustable in the Z axis. In this way, the possibility can be created of being able to freely select the diameter coordinate to be measured, in the Z axis, thereby greatly simplifying the machine construction, because it is possible to do without a mechanical height adjustment.

Because the arrangement described in the drawing enables the contact position of the upper and lower axial rolls 11, 12 with the workpiece to be measured, the speed of rotation of the axial rolls 11, 12 can be adapted to the circumferential speed of the radial roll 10 or to the speeds that occur at the axial rolls 11, 12. This feature is advantageous particularly in the case of conical rings, because in this way, a better rolling result can be achieved. It is understood that this advantage can also be utilized accordingly in the case of cylindrical rings, although here, ultimately simpler conditions are found.

The measurement results of the light section sensor 13 are made available to a forming control device 27 as an input variable 28; this device then sets the linear drives 3 and drives 6, 7, 8, the mandrel lifting apparatus 16 and other assemblies by means of corresponding output variables 29, which preferably takes place in the form of a regulation circuit. It is understood that if applicable, further input variables can also be utilized by the forming control device 27.

Thus, although at least one embodiment of the present invention has been shown and described, it is to be understood that many changes and modifications may be made thereunto without departing from the spirit and scope of the invention.

What is claimed is:

1. A forming machine comprising:
   (a) at least a first forming tool acting on a workpiece disposed in a work region so as to form the workpiece, the work region comprising a forming region, the at least first forming tool acting on the workpiece in a forming manner in the forming region;
   (b) a forming control device controlling the at least first forming tool;
   (c) an axial stand configured to be radially displaceable; and
   (d) a first light section sensor directed at the workpiece in the forming region and providing an input variable for the forming control device to set the at least first forming tool with reference to the workpiece during formation of the workpiece, the first light section sensor being disposed on the axial stand such that the axial stand is configured to radially displace the first light section sensor;
   wherein the first light section sensor irradiates a surface of the workpiece with a laser beam to measure an external diameter of the workpiece in the forming region and the external diameter so measured is provided to the forming control device, the first light section sensor monitoring reaction force generated in the workpiece during forming by irradiating the surface of the workpiece with the laser beam and detecting a change of the external diameter of the workpiece.

2. The forming machine according to claim 1, further comprising at least a second forming tool acting simultaneously with the at least first forming tool on the workpiece in opposite directions, wherein the forming region comprises at least one of a region of the workpiece between the at least first and at least second forming tools and at least one forming surface of the at least first and at least second forming tools that is directed at the workpiece.

3. The forming machine according to claim 1, further comprising at least a second light section sensor, wherein the at least second light section sensor is directed at the workpiece disposed in the work region.

4. The forming machine according to claim 3, wherein the first and at least second light section sensors are oriented to intersect or in otherwise linearly independent manner.

5. The forming machine according to claim 4, wherein the first and at least second light section sensors are directed at the workpiece both radially and axially.

6. The forming machine according to claim 3, wherein the first and at least second light section sensors are oriented in collinear manner.

7. The forming machine according to claim 1, wherein the forming machine comprises:
   a rolling machine; or
   a press; or
   a rolling machine and a hot-forming forming machine; or
   a press and a hot-forming forming machine.

8. The forming machine according to claim 7, wherein the rolling machine is a ring-rolling machine.

9. The forming machine according to claim 8, comprising at least one of a pair of radial rolls and a pair of axial rolls,
   wherein the first forming tool is a first roll of the pair of radial rolls or axial rolls, and
   wherein the first light section sensor measures from the first roll of the pair of radial rolls or axial rolls to a second roll of the pair of radial rolls or axial rolls.

10. The forming machine according to claim 8, wherein the ring rolling machine comprises a radial roll stand and wherein the first light section sensor is disposed at a location facing away from the radial roll stand and directed at the workpiece.

11. A method comprising steps of:
    (a) forming at a forming region of a forming machine a workpiece having a profile, a first forming tool of the forming machine acting on the workpiece at the forming region;
    (b) radially displacing an axial stand and a first light section sensor disposed on the axial stand;
    (c) irradiating a surface of the workpiece in the forming region via a laser beam from the first light section sensor such that an external diameter of the profile is obtained;
    (d) monitoring a reaction force generated by the workpiece during the forming by detecting a change of the external diameter of the workpiece by using the irradiating of the surface of the workpiece;
    (e) providing the external diameter of the profile and the change of the external diameter of the workpiece to a forming control device; and
    (f) controlling via the forming control device the forming machine according to the external diameter and according to the change of the external diameter of the workpiece.

12. The method according to claim 11, further comprising steps of:
    comparing, during the forming, the profile with a reference profile, the profile having been measured during the forming, and
    generating, from a comparison result of the comparing, regulating interventions for the forming.

13. The method according to claim 12, further comprising a step of:
    irradiating the profile of the workpiece by a second light section sensor.

14. The method according to claim 13, wherein the first and second light section sensors are oriented to intersect or in otherwise linearly independent manner.

15. The method according to claim 14, wherein the first and second light section sensors are directed at the workpiece both radially and axially.

16. The method according to claim 13, wherein the first and second light section sensors are oriented in collinear manner.

17. The method according to claim 12, wherein the forming machine comprises:
    a rolling machine; or
    a press; or
    a rolling machine and a hot-forming forming machine; or
    a press and a hot-forming forming machine.

18. The method according to claim 17, wherein the rolling machine is a ring-rolling machine.

19. The method according to claim 18, wherein the ring-rolling machine has at least one of a pair of radial rolls and a pair of axial rolls as forming tools, and further comprising a step of:
    measuring, via the first light section sensor, from a first roll of the pair of radial rolls or axial rolls to a second roll of the pair of radial rolls or axial rolls.

20. The method according to claim 18, wherein the first light section sensor is disposed at a location facing away from a radial roll stand, and directed at the workpiece.

* * * * *